United States Patent [19]

Chester et al.

[11] 4,276,149
[45] Jun. 30, 1981

[54] STEAM PASSIVATION OF METAL CONTAMINANTS ON CRACKING CATALYSTS

[75] Inventors: Arthur W. Chester, Cherry Hill; William A. Stover, Woodbury, both of N.J.

[73] Assignee: Mobil Oil Corporation, New York, N.Y.

[21] Appl. No.: 51,597

[22] Filed: Jun. 25, 1979

[51] Int. Cl.³ .................. C10G 11/05; C10G 11/18
[52] U.S. Cl. ......................... 208/120; 208/52 CT; 252/411 R; 252/420
[58] Field of Search ..................... 208/120–121, 208/113, 150, 164; 252/420, 416–419, 411 R

[56] References Cited

U.S. PATENT DOCUMENTS

| | | | |
|---|---|---|---|
| 2,575,258 | 11/1951 | Corneil et al. | 208/120 |
| 2,618,613 | 11/1952 | Kimberlin et al. | 252/412 |
| 2,755,231 | 7/1956 | Blanding et al. | 208/120 |
| 3,071,538 | 1/1963 | Lawson | 208/120 |
| 3,433,732 | 3/1969 | Leaman | 208/111 |
| 3,844,973 | 10/1974 | Stine et al. | 208/120 X |
| 4,064,038 | 12/1977 | Vermilion | 208/120 |
| 4,098,673 | 7/1978 | Schwarzenbek | 208/120 |
| 4,162,213 | 7/1979 | Zrinscak et al. | 208/120 X |

Primary Examiner—Delbert E. Gantz
Assistant Examiner—G. E. Schmitkons
Attorney, Agent, or Firm—C. A. Huggett; C. J. Speciale; G. W. Allen

[57] ABSTRACT

A method of passivating metal contaminants on cracking catalysts which comprises contacting said catalysts with steam for limited periods of time and at moderate temperatures.

24 Claims, No Drawings

STEAM PASSIVATION OF METAL CONTAMINANTS ON CRACKING CATALYSTS

BACKGROUND OF THE INVENTION

1. Field of the Invention

This invention is concerned with a process for the steam passivation of metal contaminants on cracking catalysts.

2. Prior Art

Before the introduction of sieve cracking catalysts in the early 1960's, there was great interest in processes for demetallization. The onset of the use of sieve catalysts with their higher tolerance for metals than nonsieve cracking catalysts temporarily reduced the interest in demetallization.

With the present growing demand for gasoline and light fuel oil, coupled with the increasing cost and decreasing availability of crude oil, there is now a renewed interest in demetallization due to the need to refine heavier crude fractions. These heavier crude fractions, such as those produced by atmospheric and vacuum crude distillation columns, are generally characterized as being undesirable as feedstocks for many refinery processes due primarily to their high metals content.

Principal metal contaminants are nickel and vanadium, with iron and small quantities of copper sometimes present. Additionally, trace amounts of zinc and sodium are found in some feedstocks. As the great majority of these metals when present in crude oil is associated with very large hydrocarbon molecules, the heavier fractions produced by crude distillation contain substantially all the metal present in the crude, such metals being particularly concentrated in the asphaltene residual fraction. The metal contaminants are typically large organometallic complexes such as metal porphyrins and asphaltenes.

When metals are present in a cracking unit chargestock, such metals are deposited on the cracking catalyst. The metals act as a catalyst poison and greatly decrease the efficiency of the cracking process.

Some of the deleterious effects of metal poisoning of cracking catalysts are as follows:

Reduced catalyst activity and selectivity;
Large increases in coke yield;
Large increases in hydrogen yield on a molar basis;
Decrease in gasoline yield;
Maxima of gasoline yield occur at lower conversion;
Physical deterioration of catalysts;
Catalysis of nonselective cracking of gas oils to undesirable products and catalysis of dehydrogenation and condensation reactions; and
Decrease in propylene, butene and isobutane yields.

The conventional approach to control the metals level in cracking units is to increase the makeup rate of fresh catalyst, coupled with an increase in withdrawal of inventory catalyst in order to maintain a constant amount of catalyst in the inventory. The higher the metal content of the feedstock, the greater the makeup rate of fresh catalyst is required and the greater is the expense. Therefore the use of the conventional approach to feedstocks having high metal contents would be quite expensive.

Prior to the discovery and use of sieve cracking catalysts in the early 1960's, various processes were employed for the demetallization of fluid cracking catalysts of the amorphous silica-alumina (nonsieve) type.

These processes can be classified into six general categories—Acid Resin Contact, Acid Complex, Inorganic Acid Treatment, Treatment with $NH_4OH$, Volatilization and Simple Abrasion.

Acid resin contact involves pretreatment of the metal contaminated catalyst with sulfuric acid, followed by oxidation and contact with an aqueous slurry of cationic resin. This general process is described in U.S. Pat. No. 3,123,548, with similar processes described in U.S. Pat. Nos. 3,192,151 and 3,260,676.

The acid complex process entails activating the contaminated catalysts with oxygen, hydrogen sulfide and chlorine, followed by contact with aqueous acid complexing agents such as citric acid. This process is described in U.S. Pat. No. 3,122,511.

Inorganic acid treatment involves contacting the contaminated catalysts with such acids as $H_2SO_4$, $HNO_3$, $HCl$ or $H_2SO_3$. The following U.S. Patents discuss this general process: U.S. Pat. Nos. 3,037,882; 3,122,497; 3,147,209; 3,147,228; 3,222,293; and 3,234,145.

Treatment with $NH_4OH$, as described in U.S. Pat. No. 3,150,103, involves precalcination of the metal contaminated catalysts and then contact with $NH_4OH$.

In the volatilization process, the metal contaminated catalyst is prereduced, then subjected to carbonyl formation with carbon monoxide interaction at low temperature under pressure. This process is described in U.S. Pat. Nos. 3,151,088 and 3,168,482.

In the simple abrasion process, the preoxidized metal poisoned catalyst is contacted with hydrogen sulfide gas at flow rates high enough to cause abrasion. This technique is disclosed in U.S. Pat. No. 3,151,059.

The aforementioned six general categories of processes were developed in conjunction with nonsieve cracking catalysts. The general applicability of all these processes to sieve (zeolite) cracking catalysts is not fully known. Many of the treatments involved in these processes may prove to be harmful when dealing with catalysts containing zeolites. Treatments at low pH will necessarily have to be eliminated, or of very short duration to avoid acid destruction of zeolite catalysts. At the same time, the metals must be in a readily soluble form to avoid the forming of complexes of these metals with the alumina in the zeolite. This may require some type of pretreatment prior to any solubilization step.

A recent process dealing with the chemical removal of metal poisons from equilibrium catalyst is described by Edison et al, *Crude and Resid Can be Cat-Cracker Feeds*, OIL & GAS JOURNAL, Dec. 20, 1976. This process is similar to the acid resin contact process and can be used with zeolite catalysts.

Recent developments dealing with the problem of metal poisoning of cracking catalysts involve the utilization of certain compounds to passivate said metals. U.S. Pat. Nos. 3,711,422; 4,025,458; and 4,031,002 describe the use of antimony compounds to passivate metals on a cracking catalyst. U.S. Pat. No. 3,977,963 discloses a method of negating the effects of metal poisoning on a cracking catalyst by the use of bismuth or manganese compounds.

It would be very advantageous to have a relatively inexpensive and nontoxic process to negate the deleterious effects of metal poisoning of cracking catalysts. Such a process is presented in this invention.

SUMMARY OF THE INVENTION

There has now been discovered a process for the steam passivation of metal contaminants on cracking compounds. Metal contaminated cracking catalysts are treated with steam at elevated temperatures for a limited period of time, which results in deactivation of the harmful metal activity present in such catalysts, without seriously affecting cracking activity.

DETAILED DESCRIPTION AND PREFERRED EMBODIMENTS

Modern catalytic hydrocarbon cracking systems use a moving bed or a fluidized bed of a particular catalyst. The cracking catalyst is subjected to a continuous cycle cracking reaction and catalyst regeneration procedure. In a fluid catalytic cracking (FCC) system, a stream of hydrocarbon feed is contacted with fluid catalyst particles in a hydrocarbon cracking region, usually at a temperature of about 800° to 1100° F. The reactions of hydrocarbons at these temperatures result in the deposition of carbonaceous coke on the catalyst particles. The resulting cracked hydrocarbon stream is thereafter separated from the coked catalyst and withdrawn from the cracking region for further processing. The coked catalyst is then steam stripped of volatiles and passed to a catalyst regeneration zone. In the catalyst regeneration zone (regenerator), the coked catalyst is contacted with a gas containing a controlled amount of oxygen in order to burn off a desired amount of coke from the catalyst and simultaneously to heat the catalyst to a high temperature desired when the catalyst is again contacted with the hydrocarbon stream in the cracking region. The catalyst is then returned to the cracking region, where it vaporizes the hydrocarbons and catalyzes hydrocarbon cracking. The flue gas formed in the catalyst regeneration zone contains the combustion products produced during the burning of the coke. The flue gas is removed from the regenerator zone. A hot catalyst storage hopper is sometimes used in order to adjust the equilibrium catalyst level in the regenerator.

The catalysts utilized for cracking can be generally classified into two groups, namely amorphous (non-sieve) catalysts and zeolitic (sieve) catalysts. The zeolitic catalysts were discovered in the early 1960's and have since become the predominate catalyst for cracking operations. The present invention is concerned with only the sieve type catalysts.

The major conventional cracking catalysts presently in use generally comprise a crystalline zeolite in a suitable matrix. Representative crystalline zeolite constituents of conventional cracking catalysts include zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), synthetic mordenite and dealuminized synthetic mordenite, merely to name a few, as well as naturally occurring zeolites, including chabazite, faujasite, mordenite, and the like. Preferred crystalline zeolites include the synthetic faujasite zeolites X and Y, with particular preference being accorded zeolite Y.

In general, the crystalline zeolites are ordinarily ion exchanged either separately or in the final catalyst with a desired cation to replace alkali metal present in the zeolite as found naturally or as synthetically prepared. The exchange treatment is such as to reduce the alkali metal content of the final catalyst to less than about 1.5 weight percent and preferably less than about 0.5 weight percent. The purpose of ion exchange is to substantially remove alkali metal cations which are known to be deleterious to cracking, as well as to introduce particularly desired catalytic activity by means of the various cations used in the exchange medium. For the cracking operation described herein, preferred cations are hydrogen, ammonium, rare earth and mixtures thereof, with particular preference being accorded rare earth. Ion exchange is suitably accomplished by conventional contact of the zeolite with a suitable salt solution of the desired cation such as, for example, the sulfate, chloride or nitrate.

It is preferred to have the crystalline zeolite of the cracking catalyst in a suitable matrix, since this catalyst form is generally characterized by a high resistance to attrition, high activity and exceptional steam stability. Such catalysts are readily prepared by dispersing the crystalline zeolite in a suitable siliceous sol and gelling the sol by various means. The inorganic oxide which serves as the matrix in which the above crystalline zeolite is distributed includes silica gel or a cogel of silica and a suitable metal oxide. Representative cogels include silica-alumina, silica-magnesia, silica-zirconia, silica-thoria, silica-beryllia, silica-titania, as well as ternary combinations such as silica-alumina-magnesia, silica-alumina-zirconia and silica-magnesia-zirconia. Preferred cogels include silica-alumina, silica-zirconia or silica-alumina-zirconia. The above gels and cogels will generally comprise a major proportion of silica and a minor proportion of the other aforementioned oxide or oxides. Thus, the silica content of the siliceous gel or cogel matrix will generally fall within the range of 55 to 100 weight percent, preferably 60 to 95 weight percent, and the other metal oxide or oxides content will generally be within the range of 0 to 45 weight percent and preferably 5 to 40 weight percent. In addition to the above, the matrix may also comprise natural or synthetic clays, such as kaolin type clays, montmorillonite, bentonite or halloysite. These clays may be used either alone or in combination with silica or any of the above specified cogels in matrix formulation.

Where a matrix is used, content of crystalline zeolite, i.e. the amount of the zeolite Y component, is generally between about 5 and about 50 weight percent. Ion exchange of the zeolite to replace its initial alkali metal content can be accomplished either prior to or subsequent to incorporation of the zeolite into the matrix.

The above compositions may be readily processed so as to provide fluid cracking catalysts by spray drying the composite to form microspheroidal particles of suitable size. Alternatively, the composition may be adjusted to suitable concentration and temperature to form bead type catalyst particles suitable for use in moving bed type cracking systems. The catalyst may also be used in various other forms such as those obtained by tabletting, balling or extruding.

The feedstocks employed in the catalytic cracking process of this invention are those which are conventionally utilized in catalytic cracking processes to produce gasoline and light distillate fractions from heavier hydrocarbon feedstocks, such as gas oils, cycle oils, residua and the like, which boil above about 450° F.

Processes dealing with the problem of metal contamination of cracking catalysts are of two general types—demetallization and passivation. Demetallization processes involve the removal of the metal contaminants from the catalysts; passivation processes reduce the harmful metal activity without substantial reduction in catalyst activity. The process of this invention is of the latter type.

It is generally recognized that metal poisons on cracking catalysts deactivate over long periods of time during the use of the catalyst. It is thought that this deactivation is brought about by the alternate oxidation and reduction cycles involved in cracking processes. The refiner would greatly benefit from a process which would speed up this deactivation of metals and further deactivate the metals to a greater degree than would ordinarily occur in the cracking process, without a concomitant deactivation of the cracking function of the catalyst.

The primary mode of cracking catalyst deactivation is contact with the steam formed during regeneration. It is now shown that, when the cracking catalyst is contacted with steam for a limited period and at moderate temperatures, catalyst deactivation can be considered to be relatively moderate, even though contact for longer times, or at higher temperatures, results in extensive catalyst deactivation. It has now been discovered that contact of a metal contaminated catalyst with steam under conditions that lead to the most moderate catalyst deactivation will, however, lead to extensive deactivation of the harmful metal components.

The degree of passivation of metal contaminants can be controlled by adjusting the parameters of steam temperature, the time the catalyst is in contact with steam and steam partial pressure. The general relationship between these parameters is the higher the steam temperature and/or the greater the steam partial pressure, the less amount of steam contact time is required to obtain a particular degree of passivation of metal contaminants. Said degree of passivation can be monitored by observed changes in the total dry gas make, the hydrogen molar yield or the ratio of hydrogen to $C_1$ and $C_2$ compounds (hydrogen factor) in the cracked hydrocarbon stream.

The preferred embodiment of this invention involves the withdrawal of a slip stream of metal contaminated catalyst from a cracking unit, preferably from the regenerator. Said slip stream is steamed for a period of ½ hour to 16 hours, preferably 2 to 12 hours, at a temperature between about 1000° F. and 1400° F., preferably between about 1200° F. and 1350° F., and at a partial pressure of steam of between about 1/10 psia and about 1000 psia. Once the required steaming is accomplished, the catalyst is returned to the cracking process.

In another embodiment of this invention, steam is introduced during regeneration. The temperature of the steam is maintained between about 1000° F. and about 1400° F., preferably between about 1200° F. and about 1350° F., and at partial pressures of steam which could vary up to the maximum pressure limit for the regenerator.

In still another embodiment of this invention, steam is added to the hot catalyst storage hopper. The hot catalyst storage hopper must be maintained, however, at the required temperature level of this process, i.e. between about 1000° F. and about 1400° F., preferably between about 1200° F. and about 1350° F., and at partial pressures of steam which could vary up to the maximum pressure limit for the hot catalyst storage hopper.

The following examples illustrate the invention, but are not to be considered as limiting the invention to the specifics involved.

EXAMPLE 1

This example serves to illustrate the effect of steaming on the cracking performance of cracking catalysts. Five commercial sieve type cracking catalysts were employed in this example. The five catalysts are hereinafter designated as Catalyst A, Catalyst B, Catalyst C, Catalyst D and Catalyst E. Properties of these five catalysts are given in Table 1.

Each of the five aforementioned catalysts was steamed for 4 hours at 1400° F. in 100% steam at 0 psig in a fluidized bed. The purpose of said steaming was to simulate the catalyst deactivation occurring during use in a commercial cracking unit.

The steamed catalysts were contacted with a feedstock of a Wide-Cut Mid-Continent Gas Oil (WCMCGO) with 3 C/O at 920° F. and 8.3 WHSV in an FCC Bench Test Unit. The results of this example are given in Table 2.

TABLE 1

| Properties of Five Commercial Cracking Catalysts | | | | | |
|---|---|---|---|---|---|
| | Catalyst A | Catalyst B | Catalyst C | Catalyst D | Catalyst E |
| $Al_2O_3$, % Wt | 41.0 | 46.3 | 59.4 | 29.6 | 32.6 |
| $SiO_2$, % Wt | 52.0 | 45.3 | 37.2 | 64.2 | 61.6 |
| $Na_2O$, % Wt | 0.80 | 0.42 | 1.00 | 0.36 | 1.02 |
| Pore Volume, cc/g | 0.44 | 0.51 | 0.47 | 0.52 | 0.27 |
| Packed Density, g/cc | 0.75 | 0.65 | 0.79 | 0.64 | 0.80 |
| Surface Area, $m^2/g$ | 169 | 217 | 328 | 264 | 115 |
| Catalyst Type* | clay-gel | clay-gel | clay | semi-synthetic | clay |

*"Catalyst Type" is defined in J. S. Magee and J. J. Blazek, Zeolite Chemistry and Catalysis, ACS Monograph, 171, ed. Jule Rabo, pp. 615-679 (1976).

TABLE 2

| Cracking Performance of Steamed Catalysts (Base Case) | | | | | |
|---|---|---|---|---|---|
| | Catalyst A | Catalyst B | Catalyst C | Catalyst D | Catalyst E |
| Conversion, % Vol | 80.3 | 81.6 | 75.0 | 80.2 | 77.1 |
| $C_5^+$ Gasoline, % Vol | 66.7 | 66.4 | 65.0 | 63.3 | 63.3 |
| Coke, % Wt | 3.6 | 4.4 | 3.0 | 4.4 | 3.5 |
| Hydrogen Factor* | 30 | 35 | 38 | 14 | 30 |

*100 × (moles $H_2$)/(moles $C_1$ + $C_2$)

EXAMPLE 2

This example will serve to illustrate the effects of catalyst metal poisoning. The same catalysts employed in Example 1 are used in this example.

The catalysts were steamed according to the procedure of Example 1. The steamed catalysts were then impregnated with a xylene chargestock mixture of WCMCGO containing 1700 ppm each of Ni and V naphthenates. The xylene was removed at 250° F. and the catalysts were heated in a fluidized bed in a stream of $N_2$ at 980° F. to allow cracking to occur. The resulting coked materials, containing approximately 350 ppm each of Ni and V, were burned clean at 1200° F. The catalysts were then evaluated in the FCC Bench Test Unit at 920° F., 3 C/O, 8.3 WHSV, WCMCGO. The effects of metal poisoning are shown in Table 3.

TABLE 3

| | Effect of Catalyst Metal Poisoning (Poisoned Catalyst Case) | | | | |
|---|---|---|---|---|---|
| Catalyst | A | B | C | D | E |
| Conversion, % Vol | 65.7 | 72.9 | 65.4 | 76.7 | 72.7 |
| Change from base case | (−14.6) | (−8.7) | (−9.6) | (−3.5) | (−4.4) |
| $C_5^+$ Gasoline, % Vol | 52.3 | 56.2 | 54.4 | 58.5 | 59.3 |
| Change from base case | (−14.4) | (−7.6) | (−10.6) | (−4.8) | (−4.0) |
| Coke, % Wt | 6.3 | 7.2 | 4.8 | 6.8 | 4.2 |
| Change from base case | (+2.8) | (+2.7) | (+1.8) | (+2.5) | (+0.7) |
| Hydrogen Factor | 575 | 571 | 647 | 309 | 171 |
| Change from base case | (+545) | (+536) | (+609) | (+295) | (+141) |

The numbers in parentheses in Table 3 are deviations from the base case—Cracking Performance of Steamed Catalysts. The data in Table 3 clearly demonstrate the expected effects of metal poisoning. These effects are activity loss (conversion loss), increased coke yield, increased hydrogen yield and loss of liquid product (gasoline).

EXAMPLE 3

Example 3 demonstrates the beneficial effects of the invention, namely the effect of steam aging metal poisoned catalysts. The catalysts used in this example are the same catalysts utilized in previous Examples 1 and 2.

The catalysts as treated according to the procedures of Example 2 were again burned clean at 1250° F. and then steamed for 4 hours at 1250° F., 0 psig with 100% steam. The catalysts were then evaluated in the FCC Bench Test Unit at 920° F., 3 C/O, 8.3 WHSV, WCMCGO. The improvements obtained by steam treating the poisoned catalysts according to the process of this invention are clearly shown in Table 4.

TABLE 4

| | Effect of Steam Aging Metal Poisoned Catalysts | | | | |
|---|---|---|---|---|---|
| Catalyst | A | B | C | D | E |
| Conversion, % Vol | 73.9 | 76.6 | 72.0 | 78.2 | 73.8 |
| Change from base case | (−6.4) | (−5.0) | (−3.0) | (−2.0) | (−3.3) |
| Change from poisoned catalyst case | (+8.2) | (+3.7) | (+6.6) | (+1.5) | (+1.1) |
| $C_5^+$ Gasoline, % Vol | 58.8 | 59.7 | 59.9 | 59.7 | 59.4 |
| Change from base case | (−7.9) | (−6.7) | (−5.1) | (−3.6) | (−3.9) |
| Change from poisoned catalyst case | (+6.5) | (+3.5) | (+5.5) | (+1.2) | (+0.1) |
| Coke, % Wt | 4.6 | 5.5 | 3.7 | 6.4 | 4.2 |
| Change from base case | (+1.0) | +1.0) | (+0.7) | (+2.0) | (+0.7) |
| Change from poisoned catalyst case | (−1.7) | (−1.7) | (−1.1) | (−0.4) | (0) |
| Hydrogen Factor | 172 | 185 | 208 | 186 | 145 |
| Change from base case | (+142) | (+150) | (+180) | (+172) | (+115) |
| Change from poisoned catalyst case | (−403) | (−386) | (−439) | (−123) | (−26) |

The data in Table 4 show that, for all the catalysts tested, the process of this invention restored catalyst activity, improved gasoline yield and decreased the undesirable high yields of coke and hydrogen. While some metal activity remained, clearly significant passivation of the metal function was accomplished. Also, apparently no significant decline in catalyst functions took place.

What is claimed is:

1. A process to passivate metal contaminants on zeolitic cracking catalysts during the process of catalytic cracking of hydrocarbons without seriously affecting cracking activity, which process comprises contacting said metal contaminant-containing catalysts with steam under moderate steaming conditions sufficient to deactivate harmful metal activity present in said catalysts but insufficient to seriously adversely affect catalytic cracking activity, said steaming conditions including steam contact at a temperature between about 1000° F. and about 1400° F., for a period of time between about ½ hour and about 16 hours and at a partial pressure of steam between about 1/10 psia and about 1000 psia.

2. The process of claim 1 wherein the temperature is between about 1200° F. and about 1350° F.

3. The process of claim 1 wherein the period of time is between about 2 hours and about 12 hours.

4. The process of claim 1 wherein said cracking catalyst is zeolite Y in a suitable matrix.

5. The process of claim 1 wherein the process of catalytic cracking of hydrocarbons is fluid catalytic cracking.

6. A process for catalytic cracking of hydrocarbons wherein
   a. a metal-containing hydrocarbon feed is introduced into a cracking region;
   b. said feed is contacted with a zeolite cracking catalyst under cracking conditions whereby the feed is cracked;
   c. the cracked feed is removed from said cracking region for further processing;
   d. said catalyst which is now deposited with coke formed during cracking is contacted with oxygen in a regeneration zone in order to burn off a desired amount of coke; and
   e. metals deposited on said cracking catalyst from said feed and tending to deactivate said cracking catalyst are passivated by removing a slip stream of said cracking catalyst from the regeneration zone and contacting said slip stream with steam at a temperature between about 1000° F. and about 1400° F., for a period of time between about ½ hour and about 16 hours and then returning said catalyst back to the regeneration zone.

7. The process of claim 6 wherein the temperature is between about 1200° F. and about 1350° F.

8. The process of claim 6 wherein the period of time is between about 2 hours and about 12 hours.

9. The process of claim 6 wherein said cracking catalyst is zeolite Y in a suitable matrix.

10. In a process which comprises contacting under cracking conditions, comprising a continuous cycle cracking reaction and catalyst regeneration procedure, a hydrocarbon feed boiling above about 450° F. with a zeolite cracking catalyst containing metal contaminants to produce a gasoline fraction, the improvement which comprises adding steam at a temperature between about 1000° F. and about 1400° F. during said regeneration in order to passivate said metal contaminants.

11. The process of claim 10 wherein the temperature is between about 1200° F. and about 1350° F.

12. The process of claim 10 wherein said cracking reaction and catalyst regeneration occur in a fluid catalytic cracking process.

13. The process of claim 10 wherein said cracking catalyst is zeolite Y in a suitable matrix.

14. In a fluid catalytic cracking process employing a hot catalyst storage hopper, which comprises contacting under cracking conditions a hydrocarbon feed boiling above about 450° F. with a zeolite cracking catalyst containing metal contaminants to produce a gasoline fraction, the improvement which comprises adding steam in said hot catalyst storage hopper at a temperature between about 1000° F. and about 1400° F.

15. The process of claim 14 wherein the temperature is between about 1200° F. and about 1350° F.

16. The process of claim 14 wherein said cracking catalyst is zeolite Y in a suitable matrix.

17. A process to achieve a predetermined level of passivation of metal contaminants on zeolite cracking catalysts during a catalytic cracking of hydrocarbons process, which comprises contacting said metal contaminant-containing catalysts with steam wherein steam temperature, steam partial pressure and steam-catalyst contact time are all simultaneously controlled in order to attain said predetermined degree of passivation.

18. The process of claim 17 wherein the steam temperature is between about 1000° F. and about 1400° F.

19. The process of claim 18 wherein the steam temperature is between about 1200° F. and about 1350° F.

20. The process of claim 17 wherein the steam-catalyst contact time is between about ½ hour and about 16 hours.

21. The process of claim 20 wherein the steam-catalyst contact time is between about 2 hours and about 12 hours.

22. The process of claim 17 wherein said cracking catalyst is zeolite Y in a suitable matrix.

23. The process of claim 17 wherein the process of catalytic cracking of hydrocarbons is fluid catalytic cracking.

24. The process of claim 17 wherein said level of passivation is determined by the group of measurements consisting of total dry gas make, hydrogen molar yield and hydrogen factor.

* * * * *